Figure 1:
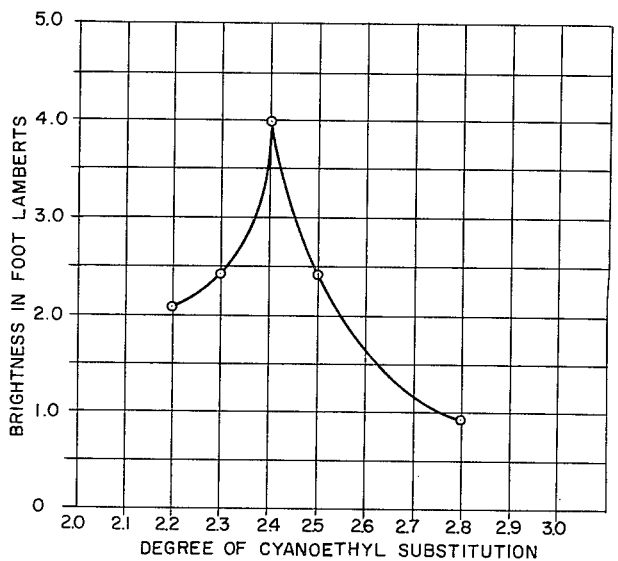

July 27, 1965 T. J. SENTEMENTES ETAL 3,197,664
ELECTROLUMINESCENT DEVICES AND AN IMPROVED DIELECTRIC
MEDIA FOR SUCH ELECTROLUMINESCENT DEVICES
Filed March 9, 1961

THOMAS J. SENTEMENTES
FREDERIC KOURY
INVENTORS

United States Patent Office 3,197,664
Patented July 27, 1965

3,197,664
ELECTROLUMINESCENT DEVICES AND AN IMPROVED DIELECTRIC MEDIA FOR SUCH ELECTROLUMINESCENT DEVICES
Thomas J. Sentementes, Wakefield, and Frederic Koury, Lexington, Mass., assignors to Sylvania Electric Products Inc., a corporation of Delaware
Filed Mar. 9, 1961, Ser. No. 94,536
10 Claims. (Cl. 313—108)

This invention relates to electroluminescent devices and more particularly to a dielectric medium suitable for use in such devices.

The phosphors in such devices have generally been embedded or dispersed in a dielectric material, for example a dielectric of plastic or ceramic. Devices using a glass dielectric have been used commercially with considerable success, but such devices were fairly rigid however, and for some purposes a mechanically flexible device was desired which could be bent to various shapes after manufacture. A plastic material of high dielectric constant was desirable for such devices and cyanoethylcellulose is such a material which can serve as a flexible, organic polymeric matrix for the electroluminescent phosphor. Such polymeric materials form dense, tough films having good mechanical and thermal stability, and are structurally acceptable for the commercial application of flexible electroluminescent devices. It was found, however, that devices produced using randomly obtained cyanoethylcellulose as the dielectric media generally do not exhibit a degree of brightness that favorably compares with devices prepared having ceramic dielectric materials.

We have discovered that flexible electroluminescent devices of superior brightness are produced when using a cyanoethylcellulose dielectric that has a degree of substitution of cyanoethyl radicals in an anhydroglucose unit of the cellulose polymer of 2.3 to 2.5 Particularly, we have discovered that the brightness of the device varies with the degree of substitution of the cyanoethyl radical in the anhydroglucose unit and this brightness was found to peak at a 2.4 degree of substitution. The brightness of the device drops off markedly after this peak to a low point at a 2.8 degree of substitution.

The basic material from which cyanoethylcellulose is derived is cellulose, and this material is a linear polymeric compound of anhydroglucose units linked at the 1 and 4 positions through glucosidic bonds with a beta configuration. The number of repeating units can vary from 50 to 5000 or more although for our purposes the number of repeating units in our cyanoethylcellulose polymer is preferably three to four hundred. When preparing cyanoethylcellulose, cyanoethyl radicals are introduced into the anhydroglucose unit throughout the length of the polymer in the 2, 5 and 6 positions. When long polymeric chains of cellulose are cyanoethylated, the degree of substitution may be controlled by controlling pressing conditions and some of the available positions for the cyanoethyl radical in the polymer may not be filled. A fully substituted cyanoethylcellulose polymer will have a degree of substitution of 3, since there are 3 available positions for the cyanoethyl radical in the anhydroglucose unit. Lesser degrees of substitution will be in whole numbers or fractions, since the degree of substitution is an average number of cyanoethyl radicals substituted over many of the long chains of cellulose polymers.

It is an object of our invention to use cyanoethylcellulose having a controlled degree of substitution as a dielectric medium in electroluminescent devices.

Another object of our invention is to prepare flexible devices exhibiting superior brightness which use cyanoethylcellulose as a dielectric medium.

An advantage of our invention is that flexible electroluminescent devices may be prepared which exhibit superior brightness when compared to previous flexible devices.

A feature of this invention is that flexible devices of superior brightness may be prepared when cyanoethylcellulose having a degree of substitution of 2.3 to 2.5 is used for the phosphor-dispersing, dielectric medium.

An important feature of our invention is that we have discovered that the use of cyanoethylcellulose having a degree of substitution of about 2.4 enables us to prepare a ploymer that needs no plasticizer to obtain good adhesion. This feature is quite important since we have found that the addition of plasticizer tends to reduce lamp brightness.

Other objects, features and advantages will become apparent to those skilled in the art upon reading the following specification when taken in conjunction with the accompanying drawing.

FIGURE 1 of the drawing is a graph illustrating on the ordinate the brightness of flexible electroluminescent devices made with cyanoethylcellulose as a dielectric media and on the abscissa the degree of cyanoethyl radical substitution in the anhydroglucose unit.

Figure 2:
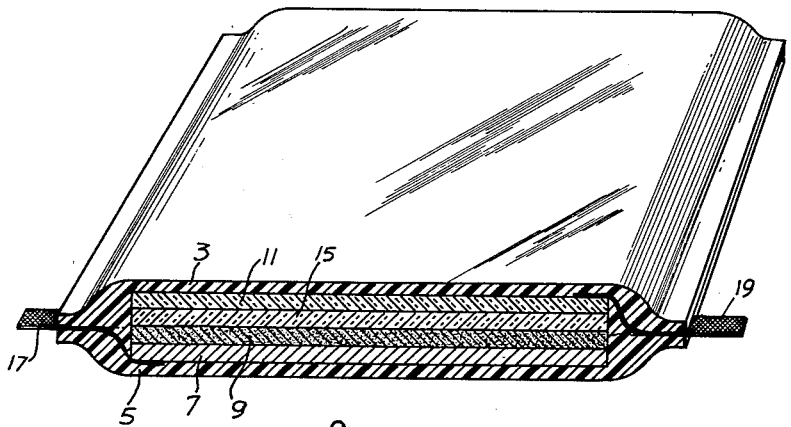

FIGURE 2 of the drawing is a cross seection in perspective of a flexible electroluminescent device which may be prepared using as the dielectric media, cyanoethylcellulose having a 2.3 to 2.5 degree of substitution.

Flexible electroluminescent devices are generally constructed of two superposed electrodes at least one of which is light transmitting. Interposed between these electrodes is a light-transmitting layer comprising a dielectric matrix of cyanoethylcellulose having a controlled degree of substitution of 2.3 to 2.5 and embedded in this dielectric is a copper-activated, zinc sulfide phosphor, such as described in the co-pending application of Goldberg et al., Serial No. 714,481, filed February 11, 1958, now Patent No. 3,050,655. When varying or alternating voltage is applied between the electrodes, light will be emitted from the phosphor.

The preparation of the cyanoethylcellulose having a controlled degree of substitution is conventional in the art and generally such materials are prepared by reacting, in the presence of weak sodium hydroxide, a large excess of acrylonitrile with an alkali cellulose derived from regenerated cellulose or possibly the corresponding alkali soluble ether. The reaction appears heterogeneous when agitation is insufficient or if suitable solvents are not present and the average degree of substitution obtained is generally in the range of 2.5 to 3.0. By adding a solvent and varying the ratio of solvent to reactants, the degree of substitution of 2.3 to 2.5 may be obtained and this particular degree of substitution is highly desirable for an electroluminescent lamp dielectric medium.

Referring to FIGURE 1 of the drawing, the brightness of a test device is recorded on the ordinate in foot lamberts at 60 cycles per second and 50 volts per mil. The degree of substitution of the cyanoethyl radical in the anhydroglucose unit is recorded on the abscissa. When the degree of substitution of the cyanoethyl radical in the anhydroglucose unit is about 2.4, the brightness of devices using such dielectric media peaks at about 4.0 foot lamberts. Serviceable devices are also produced when the degree of substitution is slightly below or slightly above 2.4, but the brightness of electroluminescent devices using such off-peak dielectrics is reduced. Since it is difficult, if not impossible, to produce uniform batches of cyanoethyl cellulose with an exact degree of substitution of 2.4, tolerances are allowed of ±.1, that is of 2.3 to 2.5, and dielectric materials within such tolerances are suitable for electroluminescent device production methods.

Adhesion is an important consideration in the electroluminescent lamp art since the dielectric medium must adhere to a surface. When using randomly obtained cyanoethylcellulose it was generally felt that to obtain adequate adhesion it would be necessary to add a plasticizer, for example cyanoethylphthalate, to the resin. We have found, however, that although plasticizers are useful for some purposes, such materials reduce lamp brightness when using our preferred dielectric material. We have further found that cyanoethylcellulose having a degree of substitution of 2.3 to 2.5 has good adhesion properties and that plasticizers are not needed to produce a serviceable electroluminescent lamp.

Although it is not our purpose to limit this invention to any particular theory, the following explanation of the superior brightness of electroluminescent devices using a dielectric material of cyanoethylcellulose having a degree of substitution of 2.3 to 2.5 is offered. It is possible that peak brightness might be related to the number of cyanopolar groups on the cellulose chain and also their ability to rotate and orient themselves in the electric field. A 2.4 degree of substitution possibly has just the proper number of cyano groups to provide a high dielectric constant and a high degree of free rotation. Degrees of substitution less than 2.4 might not have a sufficient number of polar groups to give high dielectric constants, although it does have a high degree of rotational freedom. With regard to degrees of substitution greater than 2.4, although there are more polar groups available for polarization than at the 2.4 degree of substitution, the ease with which these polar groups can rotate and orient themselves in a field is perhaps considerably reduced because of steric hindrance.

The dispersion of phosphor dielectric matrix may be prepared, for example, and without limiting the claims, by adding the cyanoethylcellulose of this invention to a small quantity of a 1 to 1 solvent mixture of acetone and dimethylformamide. Adjustments are then made so that the final formulation of the solution is 10% cyanoethylcellulose and 90% solvent. After dissolving the cyanoethylcellulose in the solvent, an electroluminescent phosphor is added to the solution while stirring. The preferred formulation of the resulting dispersion is generally in the range of 30% to 60% by volume phosphor and 40% to 70% by volume solvent. Since the dispersion is rather viscous, additional solvent is added to prepare a spraying suspension, although the dispersion may also be applied in thicker viscosities with a doctor blade.

As previously discussed, flexible electroluminescent devices are generally prepared of two flexible electrodes, at least one of which is light transmitting, and an interposed layer of phosphor embedded in dielectric. An example of a flexible device in which the instant dielectric medium has particular utility is shown in FIGURE 2 of the drawing. A flexible metal sheet 7, generally prepared of aluminum foil in thicknesses of 3 to 7 mils, may be used as one electrode; however, other materials such as metalized Mylar may also serve as this electrode. A coating or film 9 derived from the solvent-phosphor-cyanoethylcellulose dielectric dispersion is then sprayed or doctor bladed on the electrode 7 and dried. The dried film 9 is preferably 2 to 3 mils thick and produces a field strength of 40 to 60 volts per mil. A thin, transparent layer 15 of a 50–50% by volume dispersion of barium-strontium titanate in cyanoethylcellulose having a 2.3 to 2.5 degree of substitution can be interposed between the phosphor layer 9 and the electrode 7, if desired and although the layer 15 will improve the brightness of the device, it is not essential for its successful operation.

If the electrode 7 is opaque, the other electrode 11 should be light transmitting and may comprise a layer of vaporized materials such as aluminum or gold; however, other suitable materials such as metalized Mylar or electrically conductive plastics may also be used.

The entire device may then be encapsulated by heat sealing two sheets of plastic 3 and 5, which protect the device from the effects of humidity and furthermore prevent accidental scratching which might remove some of the various layers. Other methods of encapsulating the device may also be used such as molding the device in epoxy or vinyl resins. Electrical lead-in wires 17 and 19 extend through the plastic and contact each of the electrodes 7 and 11 of the device and connection of these lead-in wires to a power source will produce light emission from the phosphor through the various layers of plastic.

Although our invention has been described with particular reference to flexible electroluminescent devices, it is apparent that the superior dielectric of this invention may also be used for inflexible electroluminescent devices and will evidence similar superior properties. It is apparent that other changes and modifications may be made within the scope of the instant invention but it is our intent, however, to be limited only by the scope of the appended claims.

As our invention we claim:

1. A dielectric medium for dispersing electroluminescent phosphors comprising: cyanoethylcellulose having a degree of substitution of 2.3 to 2.5.

2. A dielectric medium for dispersing electroluminescent phosphors comprising: cyanoethylcellulose having a degree of substitution of about 2.4.

3. A dielectric medium for use in an electroluminescent device comprising: cyanoethylcellulose having a degree of substitution of 2.3 to 2.5.

4. A dielectric medium suitable for use in an electroluminescent device comprising: cyanoethylcellulose having a degree of substitution of about 2.4.

5. A dielectric medium suitable for use in an electroluminescent device having flexible electrodes comprising: cyanoethylcellulose having a degree of substitution of 2.3 to 2.5.

6. A dielectric medium suitable for use in an electroluminescent device having flexible electrodes comprising: cyanoethylcellulose having a degree of substitution of about 2.4.

7. An electroluminescent device comprising: a first electrode, a superposed second electrode, and a layer of light-emitting material between said first and second electrodes comprising an electroluminescent phosphor embedded in cyanoethylcellulose having a degree of substitution of 2.3 to 2.5.

8. An electroluminescent device comprising: a first electrode, a superposed second electrode, a layer of light-emitting material between said first and second electrodes comprising an electroluminescent phosphor embedded in cyanoethylcellulose having a degree of substitution of about 2.4.

9. An electroluminescent device comprising: a first flexible electrode, a superposed second flexible electrode, a layer of light-emitting material interposed between said first and second flexible electrodes comprising an electroluminescent phosphor embedded in cyanoethylcellulose having a degree of substitution of 2.3 to 2.5.

10. An electroluminescent device comprising: a first flexible electrode, a superposed second flexible electrode, a layer of light-emitting material interposed between said first and second electrodes comprising an electroluminescent phosphor embedded in cyanoethylcellulose having a degree of substitution of about 2.4.

References Cited by the Examiner

UNITED STATES PATENTS

| | | |
|---|---|---|
| 2,920,256 | 6/60 | Lewis. |
| 2,951,865 | 9/60 | Jaffe. |
| 3,018,402 | 1/62 | Lewis. |

GEORGE N. WESTBY, *Primary Examiner.*

RALPH G. NILSON, *Examiner.*